(12) United States Patent
Lee et al.

(10) Patent No.: US 8,957,857 B2
(45) Date of Patent: Feb. 17, 2015

(54) DEVICE AND METHOD FOR CONTROLLING MOUSE POINTER

(75) Inventors: Dong-Hyuk Lee, Seoul (KR); Mu-Sik Kwon, Seoul (KR); Sangyoun Lee, Seoul (KR); Kar-Ann Toh, Seoul (KR); Hyobin Lee, Suncheon-si (KR); Youngsung Kim, Seoul (KR); Beom-Seok Oh, Incheon (KR); Sooyeon Kim, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 860 days.

(21) Appl. No.: 12/985,915

(22) Filed: Jan. 6, 2011

(65) Prior Publication Data
US 2011/0193778 A1      Aug. 11, 2011

(30) Foreign Application Priority Data
Feb. 5, 2010  (KR) .................. 10-2010-0011069

(51) Int. Cl.
| | |
|---|---|
| G06F 3/033 | (2013.01) |
| G06F 3/01 | (2006.01) |
| G06F 3/00 | (2006.01) |
| G06F 3/03 | (2006.01) |
| G06K 9/00 | (2006.01) |
| G06G 5/00 | (2006.01) |

(52) U.S. Cl.
CPC ............ G06F 3/017 (2013.01); G06F 3/005 (2013.01); G06F 3/0304 (2013.01); G06F 3/033 (2013.01); G06K 9/00355 (2013.01)
USPC .......................................... 345/158; 345/98

(58) Field of Classification Search
USPC .................... 382/103, 107; 345/158
See application file for complete search history.

(56) References Cited

U.S. PATENT DOCUMENTS

| | | | |
|---|---|---|---|
| 6,222,465 B1 * | 4/2001 | Kumar et al. ................... 341/20 |
| 6,624,833 B1 * | 9/2003 | Kumar et al. ................. 715/863 |
| 7,295,684 B2 * | 11/2007 | Tsujino et al. ................ 382/107 |

(Continued)

FOREIGN PATENT DOCUMENTS

| | | |
|---|---|---|
| KR | 1020070030398 | 3/2007 |
| KR | 100853024 | 8/2008 |

OTHER PUBLICATIONS

Jin-Ho Cho, Apparatus for controlling image in display and method thereof, 2008-08-2010, pub#2006-0120825.*

Primary Examiner — Sath V Perungavoor
Assistant Examiner — Howard D Brown, Jr.
(74) Attorney, Agent, or Firm — The Farrell Law Firm, P.C.

(57) ABSTRACT

Disclosed is a device for controlling a mouse pointer, providing a display unit; an image photographing unit for photographing images of a first object and a second object; and a controller for setting a point between the first object and the second object detected from the photographed images as a position of a mouse pointer on the display unit, and when a distance between the first object and the second object is less than a predetermined distance, determining that a user selection instruction for the point has been input. The device detects movement of fingers using differential images according to the movement of the fingers, so that even when a continuously changing surrounding lighting or a user face having the similar color with the finger is included in a background, it is possible to accurately identify the movement of the fingers.

16 Claims, 7 Drawing Sheets

(56) References Cited

U.S. PATENT DOCUMENTS

| | | | |
|---|---|---|---|
| 7,499,569 B2* | 3/2009 | Sato et al. | 382/103 |
| 7,574,020 B2* | 8/2009 | Shamaie | 382/103 |
| 7,596,240 B2* | 9/2009 | Ito et al. | 382/103 |
| 8,018,579 B1* | 9/2011 | Krah | 356/4.01 |
| 8,115,732 B2* | 2/2012 | Wilson et al. | 345/156 |
| 8,363,010 B2* | 1/2013 | Nagata | 345/158 |
| 8,487,881 B2* | 7/2013 | Keenan | 345/173 |
| 8,593,402 B2* | 11/2013 | Stinson, III | 345/157 |
| 2008/0187178 A1* | 8/2008 | Shamaie | 382/103 |
| 2010/0020221 A1* | 1/2010 | Tupman et al. | 348/333.01 |
| 2011/0291926 A1* | 12/2011 | Gokturk et al. | 345/158 |
| 2011/0291945 A1* | 12/2011 | Ewing et al. | 345/173 |
| 2012/0069168 A1* | 3/2012 | Huang et al. | 348/77 |
| 2014/0201666 A1* | 7/2014 | Bedikian et al. | 715/771 |

* cited by examiner

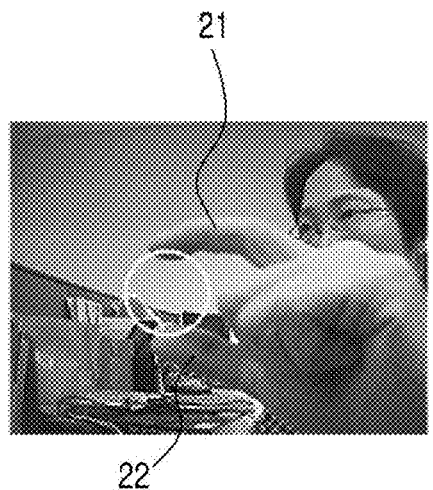
FIG.3A  FIG.3B
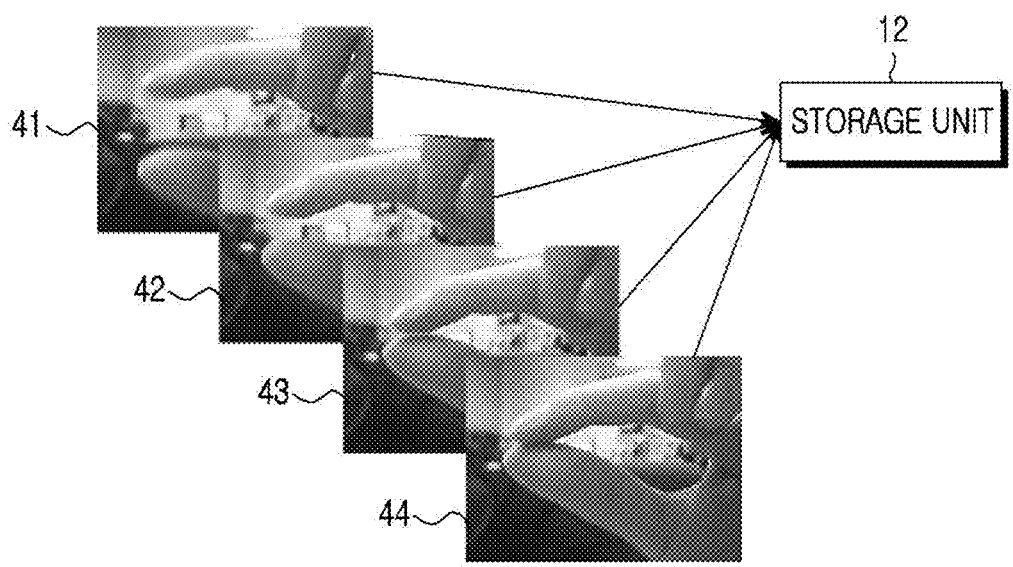
FIG.4

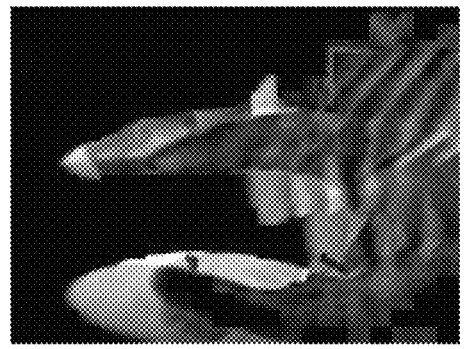
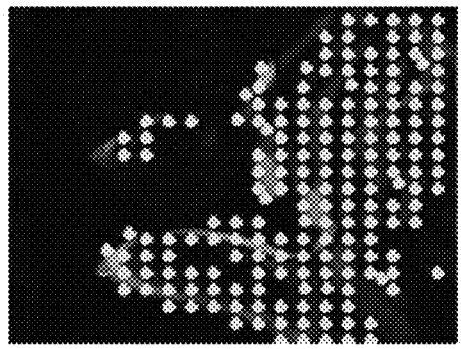
FIG.6A  FIG.6B
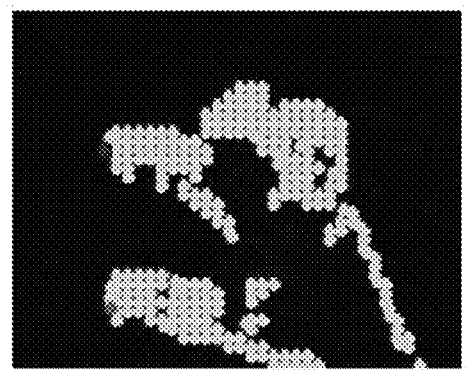
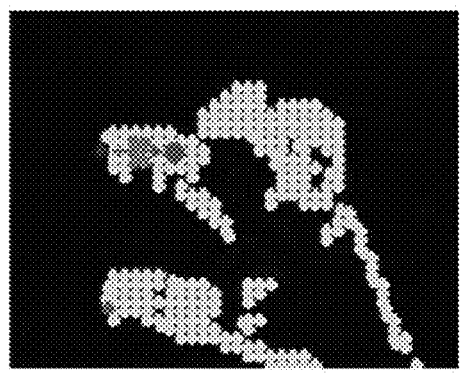
FIG.7A  FIG.7B

DEVICE AND METHOD FOR CONTROLLING MOUSE POINTER

PRIORITY

This application claims priority under 35 U.S.C. §119(a) to a Korean Patent Application filed in the Korean Industrial Property Office on Feb. 5, 2010 and assigned Serial No. 10-2010-0011069, the contents of which are incorporated herein by reference.

BACKGROUND OF THE INVENTION

1. Field of the Invention

The present invention relates generally to a device and a method for controlling a mouse pointer and, more particularly, to a device for controlling a mouse pointer without contacts according to a movement of an object.

2. Description of the Related Art

Today, a GUI (Graphic User Interface)-based program has been used in various kinds of electronic devices, such as a laptop Personal Computer (PC), a tablet PC, a navigator, a Personal Multimedia Player (PMP), and a smart phone, as well as a desktop personal computer. Generally, in the various electronic devices operated by GUI-based programs, various kinds of icons are arranged on a screen and a corresponding program is executed by a user controlling a pointer, such as a mouse pointer, and clicking the icon. In order to recognize the user control action, such as the movement of the mouse pointer or the click of the icon, various kinds of user interfaces have been developed. User interface include a mouse, a touch pad, a touch screen, a track ball, a track point, etc.

Various, high-dimensional user interfaces have been employed in electronic devices operated by GUI-based programs. However, in order to control the electronic device through the user interface, one needs to physically contact the user interface, for example by gripping the mouse with a hand. Further, when a separate interface, such as a mouse, is used with the portable electronic device, portability is decreased.

To address such a problem, Korean Patent Publication No. 10-2007-0030398 discloses a method for moving a mouse pointer displayed on a display unit included in a mobile communication terminal by a hand movement and a mobile communication terminal.

However, according to the conventional art, as a hand position is extracted using color information and the hand movement is recognized, continuous changes in surrounding lighting creates difficulty extracting hand position by using only color information. Further, in the event that an image photographing unit is mounted on a front surface of an electronic device, such as a mobile communication terminal, a user's face having the similar color as the user's hand is simultaneously photographed together with the hand, making it difficult to detect an accurate boundary between the hand and the face.

In this respect, there has been demanded a method for controlling a mouse pointer in an electronic device, which can accurately recognize fingers in a complicated background including a surrounding lighting and similar face coloration, without the addition or the replacement of additional hardware, thereby achieving the accurate control of the mouse pointer.

SUMMARY OF THE INVENTION

Accordingly, the present invention has been made to solve the above-stated problems occurring in conventional systems, and the present invention provides a method for controlling a mouse pointer in an electronic device, in which a user moves a mouse pointer displayed on a display through a movement of fingers by using an image photographing unit mounted on an electronic device, such as a mobile communication terminal, and selects a menu item according to a user selection instruction, thereby improving the convenience of the user.

Further, the present invention provides an electronic device, which identifies fingers by using a difference of images according to the movement of the fingers, so that even when a continuously changing surrounding lighting or a user face having the similar color with the fingers is included in a background, it is possible to accurately identify the movement of the fingers, thereby accurately controlling the mouse pointer.

In accordance with an aspect of the present invention, there is provided a device for controlling a mouse pointer that includes a display unit; an image photographing unit for photographing images of a first object and a second object; and a controller for setting a point between the first object and the second object detected from the photographed images as a position of a mouse pointer on the display unit, and when a distance between the first object and the second object is less than a predetermined distance, determining that a user selection instruction for the point has been input.

According to the embodiment of the present invention, the device further includes a storage unit for storing the photographed images, wherein the controller obtains differential images including pixels, in which a brightness value is determined according to a difference of brightness values of pixels arranged on an identical position of a before image and an after image between two sequential images among the photographed images and detects the first object and the second object by using the differential images.

Further, the controller groups the differential images in a predetermined number of images based on time, obtains an average differential image including pixels determined by an average value of brightness values of pixels arranged on an identical position of the differential images within each of groups, and detects the first object and the second object by using the average differential image.

Further, the controller divides the average differential image into equal blocks in a predetermined ratio, compares a sum of brightness values of pixels included in the block with a predetermined brightness value, maintains the brightness value of each pixel within an effective block having the sum equal to or larger than the predetermined brightness value, sets the brightness value of each pixel within a non-effective block having the sum less than the predetermined brightness value as zero, groups adjacent effective blocks among the effective blocks into a single group, and detects the first object and the second object form the group.

Further, the controller determines candidates of the first object and the second object from the grouped effective blocks, extracts a boundary portion of each of the candidates of the first object and the second object with a brightness value of pixels included in the determined candidates of the first object and the second object, detects a portion in which a sign of a derivative changes in a curve of the extracted boundary portion as end portions of the first object and the second object, and sets a point between the end portions of the first object and the second object as a position of the mouse pointer.

According to an embodiment of the present invention, in the detection of the end portions of the first object and the second object, the controller compares the end portions of the first object and the second object with previously detected two end portions, and when a range of a movement is larger than a predetermined range, the controller returns the previously detected two end portions.

In accordance with another aspect of the present invention, there is provided a method for controlling a mouse pointer, including photographing images of a first object and a second object; setting a point between the first object and the second object detected from the photographed images as a position of a mouse pointer; and when a distance between the first object and the second object is less than a predetermined distance, determining that a user selection instruction for the point has been input.

According to the embodiment of the present invention, the method includes obtaining differential images including pixels, in which a brightness value is determined according to a difference of brightness values of pixels arranged on an identical position of a before image and an after image between two sequential images among the photographed images and detecting the first object and the second object by using the differential images.

According to the embodiment of the present invention, the differential images are grouped in a predetermined number of images based on time and obtaining an average differential image including pixels determined by an average value of brightness values of pixels arranged on an identical position of the differential images within each of groups, and the first object and the second object are detected by using the average differential image.

Further, the method includes dividing the average differential image into equal blocks in a predetermined ratio, comparing a sum of brightness values of pixels included in the block with a predetermined brightness value, maintaining the brightness value of each pixel within an effective block having the sum equal to or larger than the predetermined brightness value, setting the brightness value of each pixel within a non-effective block having the sum less than the predetermined brightness value as zero (0), grouping adjacent effective blocks among the effective blocks into a single group, and detecting the first object and the second object form the group.

Further, the method includes determining candidates of the first object and the second object from the grouped effective blocks, extracting a boundary portion of each of the candidates of the first object and the second object with a brightness value of pixels included in the determined candidates of the first object and the second object, detecting a portion in which a sign of a derivative changes in a curve of the extracted boundary portion as end portions of the first object and the second object, and setting a point between the end portions of the first object and the second object as a position of the mouse pointer.

Further, in the detection of the end portions of the first object and the second object, the end portions of the first object and the second object is compared with previously detected two end portions is compared, and when a range of a movement is larger than a predetermined range, the previously detected two end portions is returned.

Accordingly, the mouse pointer control device and method according to the present invention operates by recognizing the movement of the object, such as the fingers or the rod-shaped object, by using the existing resource of the electronic device, such as the mobile communication terminal, so that it is not necessary to include additional hardware, thereby advantageously saving the manufacturing cost and achieving the convenience of use.

Further, the mouse pointer control device and method according to the present invention detects the movement of the fingers by using the differential images according to the movement of the fingers, so that even when the surrounding lighting continuously changes or the face of the user having the similar color with the fingers is included in the background, accurate detection of the movement of the fingers is possible.

Furthermore, the mouse pointer control device and method according to the present invention can be conveniently adopted by a user to control various contents and programs requiring a Human Computer Interface (HCI), as well as in simply selecting the menu, in the electronic device, such as the mobile communication terminal.

BRIEF DESCRIPTION OF THE DRAWINGS

The above and other aspects, features and advantages of the present invention will be more apparent from the following detailed description taken in conjunction with the accompanying drawings, in which:

FIGS. 3A and 3B illustrate an input of a user selection instruction according to a distance between a first object and a second object according to an embodiment of the present invention;

FIG. 4 illustrates images of a first object and a second object sequentially stored in a storage unit according to an embodiment of the present invention;

FIGS. 6A and 6B illustrate division of an average differential image into blocks and the setting of a brightness value for each block according to an embodiment of the present invention;

FIGS. 7A and 7B illustrate grouping of effective blocks into a single group according to an embodiment of the present invention;

DETAILED DESCRIPTION OF THE EMBODIMENTS OF THE PRESENT INVENTION

Hereinafter, in the following description of the present invention, a detailed description of known functions and configurations incorporated herein will be omitted when it may make the subject matter of the present invention rather unclear. Embodiments of the present invention will be described in detail with reference to the accompanying drawings. The following embodiments are provided only for illustrative purposes so that those skilled in the art can fully understand the spirit of the present invention.

Figure 1:
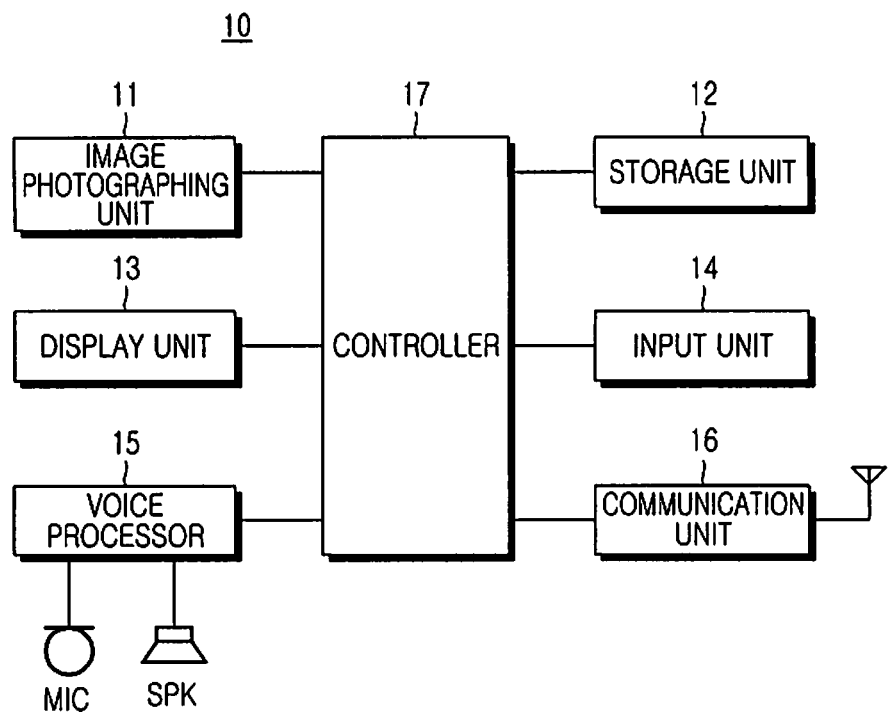
FIG. 1 is a block diagram illustrating a mouse pointer control device according to an embodiment of the present invention.

FIG. 1 is a block diagram illustrating a mouse pointer control device according to an exemplary embodiment of the present invention. As illustrated in FIG. 1, the mouse pointer control device 10 according to the exemplary embodiment of the present invention includes an image photographing unit 11, a storage unit 12, a display unit 13, an input unit 14, a voice processor 15, a communication unit 16, and a controller 17.

The image photographing unit 11 includes a digital camera and a module for processing a photographed image. The digital camera includes a lens unit, an infrared ray blocking filter, and an image sensor.

The lens unit includes plural lenses. Further, each of the plural lenses has a rotational symmetry with respect to an optical axis, and the plural lenses are arranged on the same optical axis. Further, each of the plural lenses has a spherical shape or a non-spherical shape. Further, the lens unit can include three lenses made of a plastic material.

The infrared ray blocking filter blocks incident light in an infrared band nearly outside visible light spectrum to which human eyes are not generally sensitive. The image sensor sensitively responds to the incident light of an infrared ray band (light having a wavelength of about 750 nm or more) that is difficult to be recognized by the eyes of people. Therefore, there is a difference between a color of an image photographed in the image sensor and the natural color of an object due to the incident light of the infrared ray band, so that the digital camera generally uses the infrared ray blocking filter to block the incident light of the infrared ray band.

The image sensor has a structure in which pixels having the same construction are arranged in the N×M matrix form. The image sensor can employ a Charge-Coupled Device (CCD), a Complementary Metal-Oxide Semiconductor (CMOS), or the like.

The storage unit 12 stores movement images of a first object and a second object. The storage unit 12 can employ a non-volatile memory, such as a flash memory as a construction element. Further, only necessary images are temporarily stored for the mouse pointer control and useless images are immediately deleted, the storage unit 12 can use a volatile memory. Further, the storage unit 12 can store a general program for driving the terminal 10 and applications.

The display unit 13 visually displays a position of the mouse pointer controlled according to the present invention. Further, the display unit 13 displays an icon for executing GUI-based applications. The user moves the mouse pointer on the display unit 13 via a user interface of the mouse pointer control device of the present invention, locates the mouse pointer on the icon for executing the application, and then inputs a user selection instruction, i.e. performs a click action, to execute the application.

The display unit 13 corresponds to one of visual output devices of the terminal 10. When the display unit 13 is implemented in a touch screen scheme, it can be operated as the input unit 14. The display unit 13 can be formed with a Liquid Crystal Display (LED), Organic Light Emitting Diodes (OLED), Cathode-Ray Tube (CRT), Plasma Display Panel (PDP), etc.

The input unit 14 includes keys arranged in a matrix structure, including character keys, number keys, various function keys, and outside volume keys, and outputs a key input signal corresponding to a key input of the user to the controller 17. The input unit 14 can be combined with the display unit 13 by implementing the display unit 13 in a touch screen form.

The voice processor 15 includes a microphone and a speaker. The user can identify an operation sound of the terminal 10 of the present invention through the speaker. For example, when a mouse cursor is positioned on an icon representing a specific program, an operation sound according to the icon activation can be output and an operation sound according to an instruction of selecting an icon representing a specific program, i.e. the click action, can be output.

The communication unit 16 transmits/receives voice data, character data, image data, and control data under the control of the controller 17. To this end, the communication unit 16 includes an RF transmitter for up-converting and amplifying a frequency of a transmitted signal, an RF receiver for low-noise amplifying a received signal and down-converting a frequency, and an antenna for transmission/reception. The communication unit 16 enables remote control of another communication terminal communicating with the terminal 10 by using the mouse pointer control device of the present invention.

The controller 17 sets a point between the first object and the second object in the images photographed through the image photographing unit 11 as a position of the mouse pointer on the display unit 13. When a distance between the first object and the second object is less than a predetermined distance, the controller 17 determines that a user selection instruction for the point has been input. Further, the controller 17 controls the construction elements, such as the image photographing unit 11, the storage unit 12, the display unit 13, the input unit 14, the voice processor 15, and the communication unit 16 of the terminal 10 of the present invention.

Figure 2:
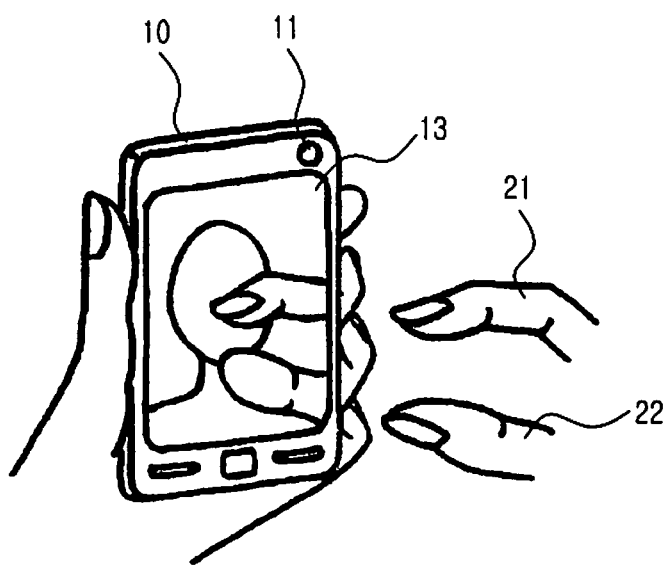
FIG. 2 illustrates the control of a mouse pointer with fingers in a mouse pointer control device according to an embodiment of the present invention.

FIG. 2 illustrates the control of the mouse pointer with fingers in the mouse pointer control device according to an embodiment of the present invention.

As illustrated in FIG. 2, the display unit 13 and the image photographing unit 11 are mounted on a front surface of the terminal 10. The image photographing unit 11 photographs the first object 21 and the second object 22. The photographed image serves as data for recognition and determination of the position of the mouse pointer and the user selection instruction, and need not be displayed on the display unit 13. However, in order to identify the movement state of the mouse pointer, the image photographed through the image photographing unit 11 may be displayed on the display unit 13, and preferably can be semi-transparently displayed such that the photographed image is viewed while overlapping with a driving screen of the terminal.

The first object and the second object can be any rod shaped object. According to the embodiment of the present invention, the first object and the second object photographed by the image photographing unit 11 and processed by the controller 17 are two fingers of a person. The first object and the second object may be a single finger of each, respective hand of a user, but it is preferred that the first object and the second object are two fingers of the same hand. Further, the two fingers can be the combination of the index finger and the middle finger or the combination of the middle finger and the ring finger within one hand, but the combination of the thumb and the index finger or the index finger and the thumb is preferably for the first object and the second object. In FIG. 2, the index finger is the first object 21 and the thumb is the second object 22.

As shown in FIG. 2, it can be noted that in addition to the first object of the index finger and the second object of the thumb, a face and a part of a body having a similar color with a finger can be photographed by the image photographing unit 11. The mouse pointer control device according to the conventional art has difficulty in discriminating the color difference because the color of the first object and the second object are identical to that of a background in this image and thus has difficulty in detecting the movement of the first object and the second object, thereby failing to smoothly controlling the mouse pointer. However, the mouse pointer control device according to the present invention detects differential images from the photographed images of the first object and the second object, i.e. the movement of the first object and the second object, and controls the mouse pointer, so that even when another similarly colored object is included in the background, the mouse pointer control device according to the present invention can readily detect movement, thereby providing smoother control of the mouse pointer.

FIGS. 3A and 3B illustrate an input of a user selection instruction according to a distance between the first object and the second object.

As previously described, the user selection instruction refers to a specific action, such as a click or double click of a specific icon arranged on a background screen of the user terminal, for performing a specific function, such as an execution of a specific application.

FIG. 3A illustrates a distance between the first object of the index finger and the second object of the thumb being greater than or equal to a predetermined distance. The predetermined distance can be optionally set by the user and can be variously changed as occasion demands. For example, the user can variously set the predetermined distance in accordance with a thickness of the first object, e.g. 50 pixels, 5 mm, etc. When the distance between the first object and the second object is equal to or larger than the predetermined distance set by the user, the terminal according to the present invention determines that the user selection instruction has not been input and sets a point between the first object and the second object as a position of the mouse pointer on the display unit and only moves the position of the mouse pointer according to the movement of the first object and the second object.

FIG. 3B illustrates a distance between the first object of the index finger and the second object of the thumb being less than the predetermined distance. In this case, the terminal according to the present invention determines that the user inputs the user selection instruction of a specific icon located at the position of the corresponding mouse pointer and executes a corresponding operation.

According to an embodiment of the present invention, if an action of pursing (pinching) and opening the index finger of the first object and the thumb of the second finger is determined as a single click action, when the user sequentially performs the click action two times, this can be set to be determined as the performance of the double click. In this case, the terminal can set a threshold time range between a previous click and a sequential next click, and when two clicks are performed within the threshold time range, the two clicks are recognized as the double click. Further, the terminal can implement a drag-and-drop function, in which the user locates the mouse pointer on a specific icon, fixes the icon to the mouse pointer through pursing the thumb and the index finger, moves the mouse pointer to another position so as to move the icon to the another position, opens the thumb and the index finger by at least predetermined distance, and release the fixing of the icon.

Further, when the various user selection instructions are input, an operation sound corresponding to each of the user selection instructions is output through the voice processor 15.

FIG. 4 illustrates images of the first object and the second object sequentially stored in the storage unit 12. As illustrated in FIG. 4, the photographed images of the first object and the second object are stored in the storage unit 12. However, taking the capacity of the storage space into consideration, useless images following completion of the processing of the image for the mouse pointer can be deleted as occasion demands. FIG. 4 illustrates four continuous images sequentially stored in the storage unit 12.

Figure 5:
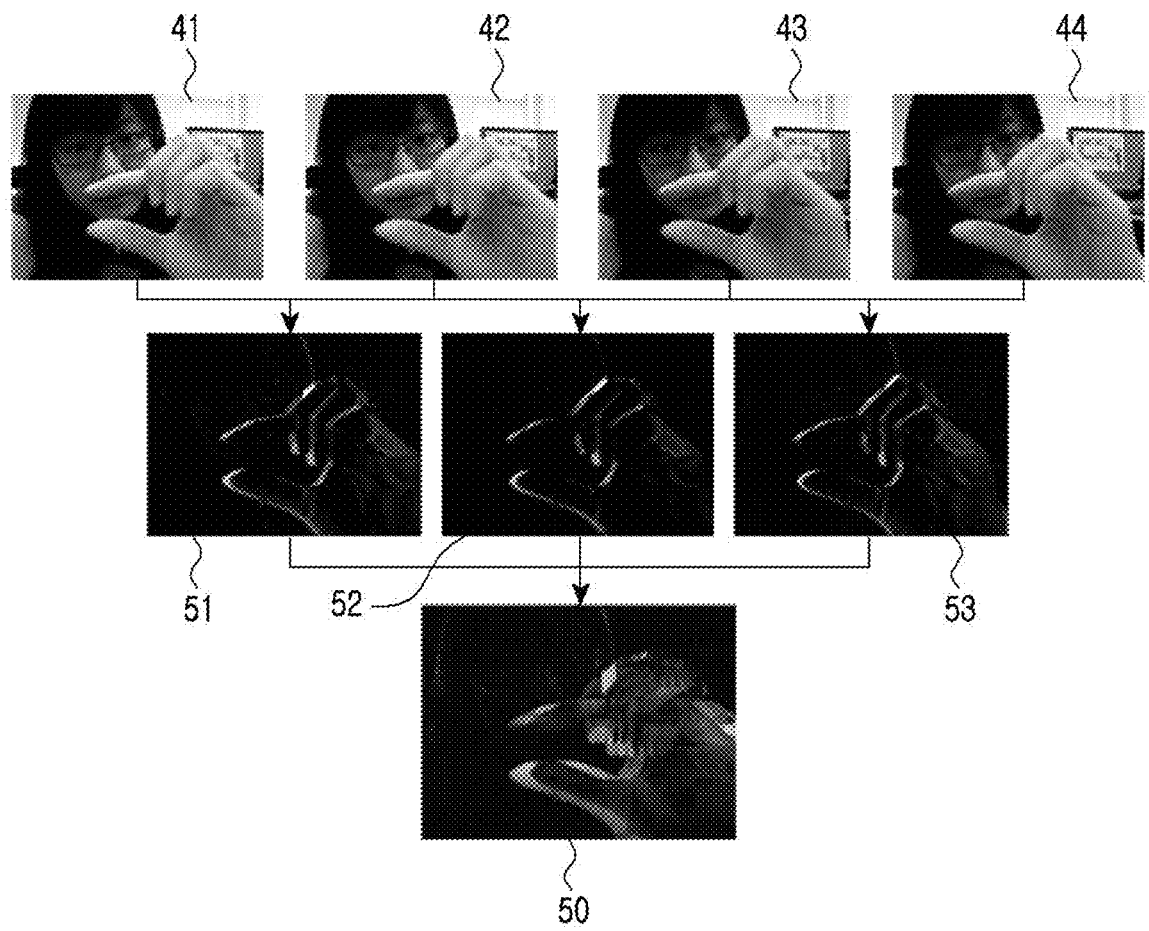
FIG. 5 illustrates an obtainment of differential images and an average differential image by a control unit according to an embodiment of the present invention.

FIG. 5 illustrates an obtainment of differential images and an average differential image in the control unit 17.

Referring to FIG. 5, the controller 17 receives four sequential images (i.e. still pictures or frames) of the first object and the second object from the image photographing unit 11 or the storage unit 12. The controller 17 obtains differential images between sequential before and after images from the received four images, respectively. The differential image refers to an image including pixels, in which a brightness value is determined according to a difference of brightness values of pixels arranged on an identical position of the two sequential images, i.e. the before image and the after image. As shown in the embodiment of the FIG. 5, it is possible to obtain a total of three differential images 51, 52, and 53 from the four received images of the first object and the second object. The differential image may be an 8 bit gray scale image.

After obtaining the differential images, the controller 17 obtains an average differential image 50 from the differential images 51, 52, 53. The average differential image refers to an image including pixels determined by an average value of brightness values of pixels arranged on the identical position of the differential images within each group, into which the differential images are grouped based on time in a unit of a predetermined number of images. In the embodiment of FIG. 5, it is possible to obtain a single average differential image 50 by calculating an average value of the three differential images 51, 52, and 53. The average differential image may be an 8 bit gray scale image.

According to the embodiment of the FIG. 5, the controller 17 obtains the differential images from the four images and the average differential image from the three differential images. However, it is possible to obtain the differential images and the average differential image from five or more images or three images and control the mouse pointer.

However, when the position of the mouse pointer is determined using the differential image obtained from two images, as the movement of the first object and the second object is little, it may be difficult to discriminate the movement from the differential image through the comparison with a non-movement region. On the other hand, when the controller 17 obtains the differential images and the average differential image from the large number of images, as the movement of the first object and the second object is too great, it may be difficult to accurately detect the movement of the first object and the second object. Therefore, it is preferred to obtain the differential images and the average differential image from four to ten images and detect the mouse pointer.

FIGS. 6A and 6B illustrate the division of the average differential image into blocks and the setting of a brightness value for each block.

Referring to FIGS. 6A and 6B, the controller 17 vertically and horizontally divides the average differential image obtained in FIG. 5 into equal blocks in a predetermined ratio and compares a sum of brightness values of pixels included in the divided blocks with a predetermined brightness value. When the block has the sum equal to or larger than the predetermined brightness value, the controller 17 determines the block as an effective block, and maintains the brightness value of each pixel within the effective block. However, when the block has the sum less than the predetermined brightness value, the controller 17 determines the block as a non-effective block, and sets the brightness value of each pixel within the non-effective block as zero (0).

The predetermined ratio for the division can be optionally set by the user. For example, the average differential image can be equally divided by an 8×6 vertical to horizontal ratio.

The predetermined brightness value can be optionally set by the user. For example, if the brightness degrees are 1 to 255 in the average differential image of the 8-bit gray scale, a brightness value corresponding to brightness degree 128 is set as the predetermined brightness value and the set brightness value is multiplied by the number of pixels, and when the sum of the brightness values within the block is less than 128 times the number of pixels, the brightness value of every pixel within the block is set as zero ("0").

FIG. 6A illustrates the average differential image, and FIG. 6B illustrates the average differential image divided into the equal blocks in a predetermined ratio, with a brightness value is set for each block, and points are placed on the effective blocks. That is, regions corresponding to the points drawn in a round shape are determined to have movement, to be indicated.

FIGS. 7A and 7B illustrate the grouping of the effective blocks into a single group.

Referring to FIGS. 7A and 7B, the controller 17 groups adjacent effective blocks among the effective blocks in a single group. That is, in the process according to FIGS. 6A and 6B, to improve a performance of estimated finger portions, the controller 17 groups the adjacent effective blocks into the single group. In an embodiment of the present invention, in which the estimated finger portions including movement are classified like original shapes of the first object and the second object, but most of the estimated finger portions are discontinuously distributed, it is difficult to detect the first object and the second object. In order to solve the problem, the adjacent effective blocks among the effective blocks including the estimated finger portions are grouped into the single group. When a size of multiple generated groups is larger than a predetermined size, the controller 17 determines the group as a noise and sets a brightness value of the group as zero ("0"), to remove the group.

Figure 8A:
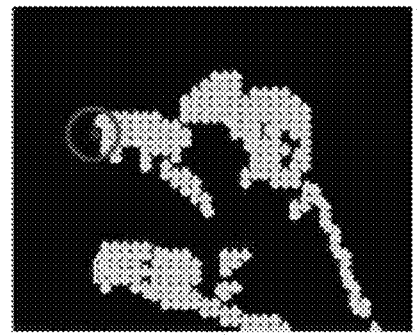
FIGS. 8A to 8C illustrate detection of a first object and a second object according to an embodiment of the present invention.
Figure 8B:
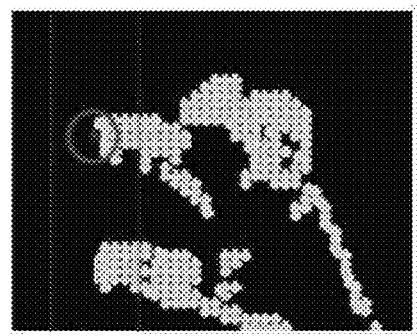
Figure 8C:
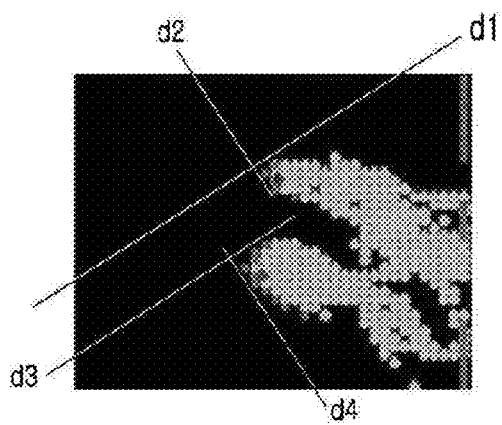

FIGS. 8A to 8C illustrate the detection of the first object and the second object.

Referring to FIGS. 8A to 8C, the controller 17 determines candidates of the first object and the second object from the grouped effective blocks, extracts boundary portions of the first object and the second object with the brightness value of the pixels included in the determined candidates of the first object and the second object, detects a part in which a sign of a derivative changes in a curve of each of the extracted boundary portions as end portions of the first object and the second object, and sets a point between the end portions of the first object and the second object as the position of the mouse pointer on the display unit.

In order to determine the end portion of the first object indicated in FIG. 8A, it is possible to find a point having an infinite gradient as the end portion of the first object. However, as shown, since the first object has a shape considerably different from its original shape, multiple points having the infinite gradient may exist in the shape, which may make it impossible to set a mouse pointer. Therefore, according to the embodiment of the present invention, the controller 17 determines the candidate of the first object.

In determining the candidate of the first object, in order to maintain the consistency of the movement of the mouse pointer, the relation between the current candidate of the first object and the candidate of the first object obtained from the previous average differential image can be obtained. Further, by controlling a range of the movement of the first object and the second object, it is possible to prevent sudden change of the position of the first object and the second object.

Further, according to an embodiment of the present invention, when using the index finger as the first object and the thumb as the second object, it is possible to determine the candidates of the first object and the second object utilizing the fact that end portions of the fingers are positioned in a right part of the display unit 13 in the event of the use of the left hand and positioned in a left part of the display unit 13 in the event of the use of the right hand.

The controller 17 extracts a boundary portion with the brightness value of the pixels included in the candidates, investigates a tangential gradient, i.e. the derivative, of the extracted boundary portion, and detects a portion in which a sign of the derivative changes as the end portion of the first object.

FIG. 8C schematically illustrates the portion in which the sign of the derivative changes. As shown, a derivative d1 corresponding to a positive (+) is changed to a derivative d2 corresponding to a negative (−) in a region corresponding to the first object and the end portion of the first object is present between the positive region and the negative region. Therefore, a contact point having the infinite derivative among the two regions is detected as the end portion of the first object. In the same manner, the contact point having the infinite derivative among the contact points, in which a derivative d3 corresponding to a positive (+) is changed to a derivative d4 corresponding to a negative (−) in the region corresponding to the second object, is detected as the end portion of the second object.

The controller 17 sets a point between the detected end portions of the first object and the second object as the position of the mouse pointer on the display unit. When a distance between the end portions is less than a predetermined distance, the controller 17 determines that the user selection instruction has been input for the position of the mouse pointer. The point is set as the position of the mouse pointer, but a center point between the end portions can be preferably set as the position of the mouse pointer.

A mouse pointer control method according to an embodiment of the present invention includes photographing images of a first object and a second object, setting a point between the first object and the second object detected from the photographed images as a position of the mouse pointer, and, when a distance between the first object and the second object is less than a predetermined distance, determining that a user selection instruction for the point has been input.

In the embodiment, differential images including pixels, in which a brightness value is determined according to a difference of the brightness values of pixels arranged on the identical position of the before image and the after image between the sequential two images among the photographed images, are obtained and the first object and the second object are detected by using the differential images.

Further, the differential images are grouped in a predetermined number of differential images based on time, an average differential image including pixels determined by an average value of the brightness values of the pixels arranged on the identical position of the differential images within each of the groups is obtained, and the first object and the second object are detected using the average differential image.

Further, the average differential image is divided into equal blocks in a predetermined ratio, a sum of the brightness values of the pixels included in the blocks is compared with a predetermined brightness value. When the block has the sum equal to or larger than the predetermined brightness value, the block is determined as an effective block and the brightness value of each pixel within the effective block is maintained.

However, when the block has the sum less than the predetermined brightness value, the block is determined as a non-effective block and the brightness value of each pixel within the non-effective block is set as zero (0). The adjacent effective blocks among the effective blocks are grouped into a single group and the first object and the second object are detected from the group.

Further, candidates of the first object and the second object are determined from the grouped effective blocks, a boundary portion of each of the candidates of the first object and the second object is extracted with the brightness values of the pixels included in the determined candidates of the first object and the second object, and a portion in which a sign of a derivative in a curve of each of the extracted boundary portions is set as end portions of the first object and the second object, and a point between the end portions of the first object and the second object is set as a position of the mouse pointer.

In the embodiment, in the detection of the end portions of the first object and the second object, through the comparison with the previously detected two end portions, when a movement range is larger than a predetermined range, the previously detected two end portions can be returned.

Figure 9:
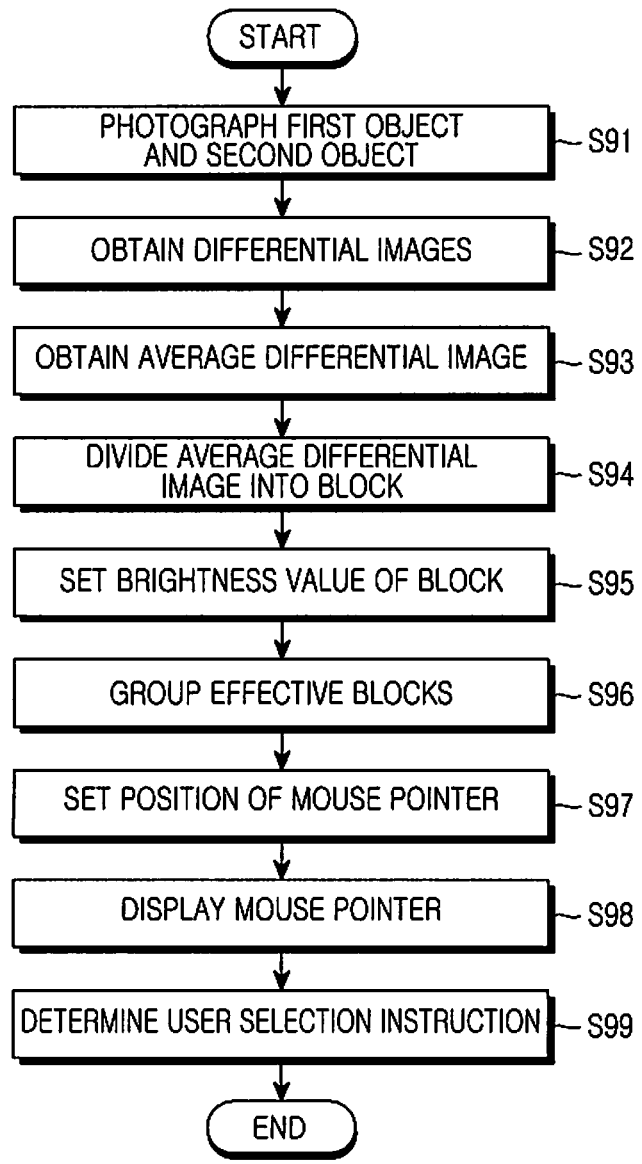
FIG. 9 is a flowchart illustrating a mouse pointer control method according to an embodiment of the present invention.

FIG. 9 is a flowchart illustrating the mouse pointer control method according to an embodiment of the present invention.

As described in FIG. 9, in Step 91 images of a first object and a second object are photographed using the image photographing unit. The photographed image serves as only data for recognition and determination of a position of the mouse pointer and the user selection instruction, so that it is not displayed on the display unit. However, in order to identify the movement state of the mouse pointer, the images photographed through the image photographing unit may be displayed on the display unit, and especially can be semi-transparently displayed such that the photographed image is viewed while overlapping with a driving screen of the terminal.

The first object and the second object can be any object, preferably of a rod shape, for example the first object and the second object are fingers of the user's hand or hands.

In Step 92 the differential images are obtained from the before image and the after sequential image among the sequential images (i.e. still pictures or frames) of the first object and the second object. In Step 93 an average differential image is obtained, with the differential images are grouped in a predetermined number of images based on time and the average differential image including pixels determined by an average value of brightness values of pixels arranged on an identical position of the differential images within each group.

In Step 94 the average differential image is divided into blocks, with the obtained average differential image vertically and horizontally divided into equal blocks of a predetermined ratio. Step 94 corresponds to a preliminary step for removing an unnecessary movement, such as a movement of the background, except for the first object and the second object, as described above.

In Step 95 of FIG. 9 a brightness value of the block is set, with a sum of the brightness values of pixels included in the divided blocks compared with a predetermined brightness value.

Figure 10:
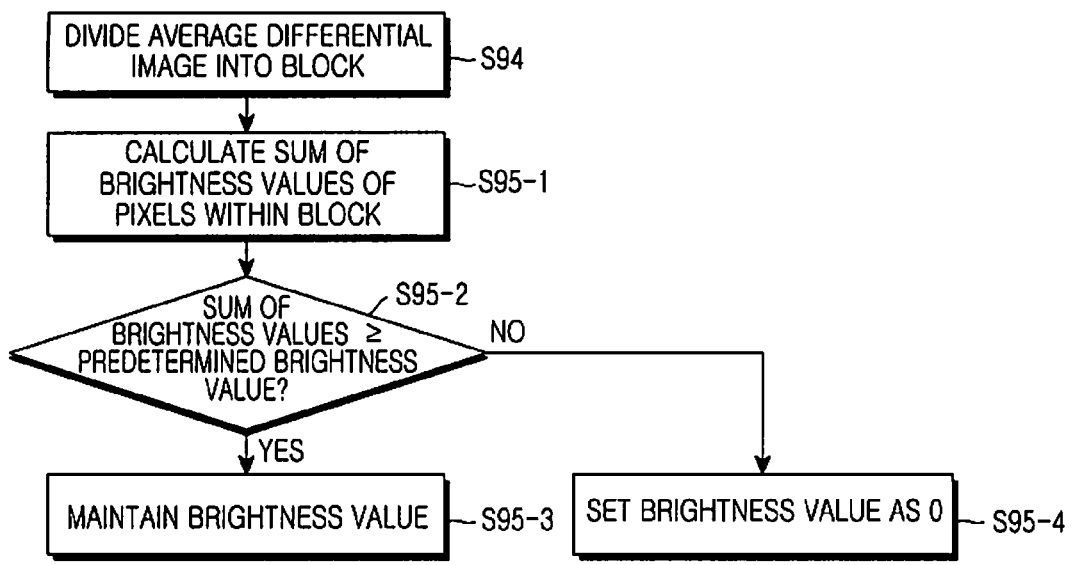
FIG. 10 is a flowchart illustrating a process of setting a brightness value of a block in the mouse pointer control method according to an embodiment of the present invention.

Referring to the flowchart provided in FIG. 10, a predetermined brightness value can be optionally set by the user. Following the dividing of an average differential image divided into a block in Step 94 of FIG. 9, a sum is calculated of brightness values of pixels within the block in Step 95-1. In Step 95-2 a determination is made of whether the sum of the brightness values is greater than or equal to a predetermined brightness value. If the determination is that the sum of the brightness values is greater than or equal to the predetermined brightness value, a brightness value is maintained in Step 95-3. If the determination is that the sum of the brightness values is less than the predetermined brightness value, the brightness value is set to zero in Step 95-4.

Returning to FIG. 9, in Step 96 effective blocks are grouped to improve performance of estimated finger portions, the details of which are described above.

In Step 97 the position of the mouse pointer is set, with candidates of the first object and the second object determined from the grouped effective blocks as described above.

In Step 98 the mouse pointer is displayed on the set position, making it possible to use various shapes of the mouse pointer, and a different shape of the mouse pointer can be used for the user selection instruction, i.e. the click operation or the double click operation.

In Step 99 the user selection instruction is determined when a distance between the first object and the second object or between the end portions of the first object and the second object is less than a predetermined distance, as described above.

According to an embodiment of the present invention, an action of pursing and opening the index finger of the first object and the thumb of the second finger is determined as a single click action, when the user sequentially performs the click action two times, this can be set to be determined as the performance of the double click. In this case, it is possible to set a threshold time range between a previous click and a sequential next click, and determine only the performance of two clicks within the threshold time range as the double click. Further, according to the embodiment of the present invention, it is possible to implement a drag-and-drop function, in which the user locates the mouse pointer on a specific icon, fixes the icon to the mouse pointer through pursing the thumb and the index finger, moves the mouse pointer to another position to move the icon to the another position, opens the thumb and the index finger by at least predetermined distance, and releases the fixing of the icon.

Further, when the various user selection instructions are input, an operation sound corresponding to each of the user selection instructions is output through the voice processor.

Steps 91 to 99 of FIG. 9 show a method to execute the mouse pointer control method in the terminal. The mouse pointer control method according to the present invention is operated by recognizing the movement of the object, such as the finger or the rod-shaped object, by using an existing resource of the mobile communication terminal, so that it is not necessary to include additional hardware, thereby advantageously saving the manufacturing cost and achieving the convenience of use.

Further, the mouse pointer control device and method according to the present invention detects the movement of the finger by using the differential images according to the movement of the finger, so that even when the surrounding lighting continuously changes or the face of the user having the similar color with the fingers is included in the background, it is advantageously possible to accurately detect the movement of the finger.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. A mobile communication terminal for controlling a pointer, the mobile communication terminal comprising:
a display unit;
an image photographing unit for photographing images of a first finger and a second finger; and
a controller configured for:
setting a point between the first finger and the second finger detected from the photographed images as a position of the pointer on the display unit, when the first finger and the second finger are not in contact with each other, and
when a distance between the first finger and the second finger is less than a predetermined distance, determining that a user selection instruction for the point has been input.

2. The mobile communication terminal of claim 1, further comprising a storage unit for storing the photographed images,
wherein the controller obtains differential images including pixels, in which a brightness value is determined according to a difference of brightness values of pixels arranged on an identical position of a before image and an after image between two sequential images among the photographed images and detects the first finger and the second finger using the differential images.

3. The mobile communication terminal of claim 1, wherein the controller is configured for dragging and dropping an icon displayed on the display unit when the first and second fingers are pursed, moved, and then opened by at least the predetermined distance.

4. The mobile communication terminal of claim 1, wherein the controller is configured for double-clicking an icon displayed on the display unit when the first and second fingers are pursed, and then opened by at least the predetermined distance.

5. The mobile communication terminal of claim 2, wherein the controller groups the differential images in a predetermined number of images based on time, obtains an average differential image including pixels determined by an average value of brightness values of pixels arranged on an identical position of the differential images within each of the groups, and detects the first finger and the second finger using the average differential image.

6. The mobile communication terminal of claim 5, wherein the controller divides the average differential image into equal blocks in a predetermined ratio, compares a sum of brightness values of pixels included in each block with a predetermined brightness value, maintains the brightness value of each pixel within an effective block having a sum equal to or larger than the predetermined brightness value, sets the brightness value of each pixel within a non-effective block having the sum less than the predetermined brightness value as zero, groups adjacent effective blocks among the effective blocks into a single group, and detects the first finger and the second finger form the group.

7. The mobile communication terminal of claim 6, wherein the controller determines candidates of the first finger and the second finger from the grouped effective blocks, extracts a boundary portion of each of the candidates of the first finger and the second finger with a brightness value of pixels included in the determined candidates of the first finger and the second finger, detects a portion in which a sign of a derivative changes in a curve of the extracted boundary portion as end portions of the first finger and the second finger, and sets a point between the end portions of the first finger and the second finger as the position of the pointer.

8. The mobile communication terminal of claim 7, wherein in the detection of the end portions of the first finger and the second finger, the controller compares the end portions of the first finger and the second finger with previously detected two end portions, and when a range of a movement is larger than a predetermined range, the controller returns the previously detected two end portions.

9. A method for controlling a pointer by a mobile communication terminal, the method comprising the steps of:
photographing images of a first finger and a second finger;
setting a point between the first finger and the second finger detected from the photographed images as a position of the pointer, when the first finger and the second finger are not in contact with each other; and
when a distance between the first finger and the second finger is less than a predetermined distance, determining that a user selection instruction for the point has been input.

10. The method of claim 9, further comprising obtaining differential images including pixels, in which a brightness value is determined according to a difference of brightness values of pixels arranged on an identical position of a before image and an after image between two sequential images among the photographed images and detecting the first finger and the second finger using the differential images.

11. The method of claim 9, further comprising dragging and dropping an icon displayed on a display unit of the mobile communication terminal, when the first and second fingers are pursed, moved, and then opened by at least the predetermined distance.

12. The method of claim 9, further comprising double-clicking an icon displayed on the display unit, when the first and second fingers are pursed, and then opened by at least the predetermined distance.

13. The method of claim 10, further comprising grouping the differential images in a predetermined number of images based on time and obtaining an average differential image including pixels determined by an average value of brightness values of pixels arranged on an identical position of the differential images within each of the groups, and detecting the first finger and the second finger using the average differential image.

14. The method of claim 13, further comprising dividing the average differential image into equal blocks in a predetermined ratio, comparing a sum of brightness values of pixels included in each block with a predetermined brightness value, maintaining the brightness value of each pixel within an effective block having a sum equal to or larger than the predetermined brightness value, setting the brightness value of each pixel within a non-effective block having the sum less than the predetermined brightness value as zero, grouping adjacent effective blocks among the effective blocks into a single group, and detecting the first finger and the second finger form the group.

15. The method of claim 14, further comprising determining candidates of the first finger and the second finger from the grouped effective blocks, extracting a boundary portion of each of the candidates of the first finger and the second finger with a brightness value of pixels included in the determined candidates of the first finger and the second finger, detecting a portion in which a sign of a derivative changes in a curve of the extracted boundary portion as end portions of the first finger and the second finger, and setting a point between the end portions of the first finger and the second finger as the position of the pointer.

16. The method of claim 15, wherein in the detection of the end portions of the first finger and the second finger, the end portions of the first finger and the second finger are compared with previously detected two end portions, and when a range of a movement is larger than a predetermined range, the previously detected two end portions are returned.

* * * * *